Feb. 19, 1924.

1,484,124

H. B. FOSTER ET AL

ROTARY INTERNAL COMBUSTION ENGINE

Filed Feb. 8, 1922     3 Sheets-Sheet 1

Inventors
Henry B. Foster
Joseph G. Furstenberg
by Orwig & Hague Attys.

Inventors
Henry B. Foster
Joseph G. Furstenberg
by Orwig and Hague Attys.

Feb. 19, 1924.
H. B. FOSTER ET AL
1,484,124
ROTARY INTERNAL COMBUSTION ENGINE
Filed Feb. 8, 1922  3-Sheets-Sheet 3
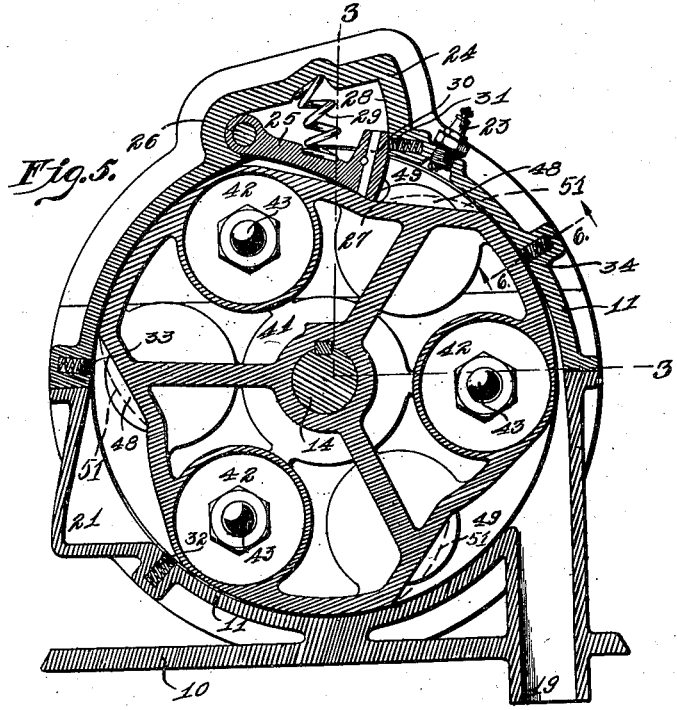
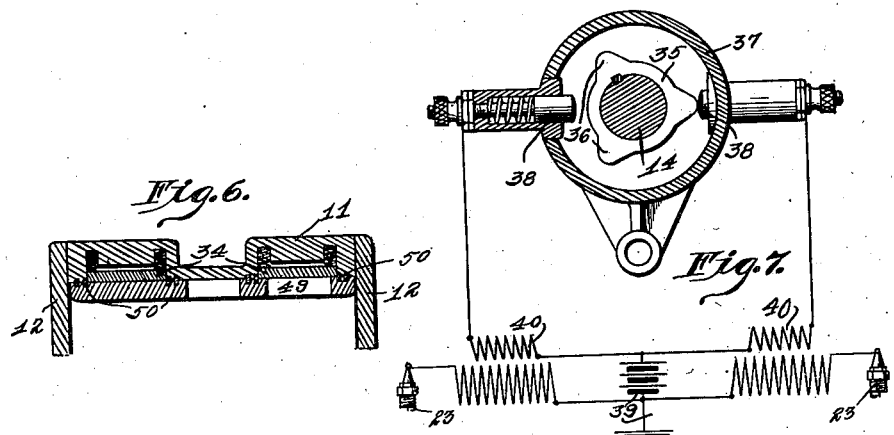

Patented Feb. 19, 1924.

1,484,124

UNITED STATES PATENT OFFICE.

HENRY B. FOSTER AND JOSEPH G. FURSTENBERG, OF OMAHA, NEBRASKA.

ROTARY INTERNAL-COMBUSTION ENGINE.

Application filed February 8, 1922. Serial No. 534,941.

*To all whom it may concern:*

Be it known that we, HENRY B. FOSTER and JOSEPH G. FURSTENBERG, citizens of the United States, and residents of Omaha, in the county of Douglas and State of Nebraska, have invented a certain new and useful Rotary Internal-Combustion Engine, of which the following is a specification.

The object of our invention is to provide an engine of the type mentioned of simple, durable and inexpensive construction, especially designed to utilize liquid fuel to its maximum capacity, and especially designed to occupy a minimum of space and to operate at high speed.

More specifically it is our object to provide an engine of this class in which the fuel gases are properly and efficiently compressed before being exploded and in which leakage from the explosion chambers is reduced to minimum.

A further object is to provide an engine of this class in which the movable abutments against which the explosive force is directed to cause the cylinder to rotate is made to move without shock or jar and without excessive wear so that said abutments may continue to operate for a long time without renewal or replacement.

A further object is to provide an engine of this class that may be air cooled and in which the air is compelled to circulate rapidly close to the explosion chambers for cooling them and without providing additional mechanism for producing said air currents.

Our invention consists in the construction, arrangement and combination of the various parts of the device, whereby the objects contemplated are attained, as hereinafter more fully set forth, pointed out in our claims, and illustrated in the accompanying drawings, in which:

Figure 1 shows a side elevation of an engine embodying our invention.

Figure 2 shows a sectional view on the line 2—2 of Figure 1 to illustrate the general contour of a piston operating cam in the stationary engine heads.

Figure 5 shows a sectional view on the line 5—5 of Figure 3.

Figure 6 shows a sectional view on the line 6—6 of Figure 5, and

Figure 7 shows a sectional view of the electrical timer and also illustrates diagrammatically the electric circuit in which the timer and spark plugs are included.

Figure 4:
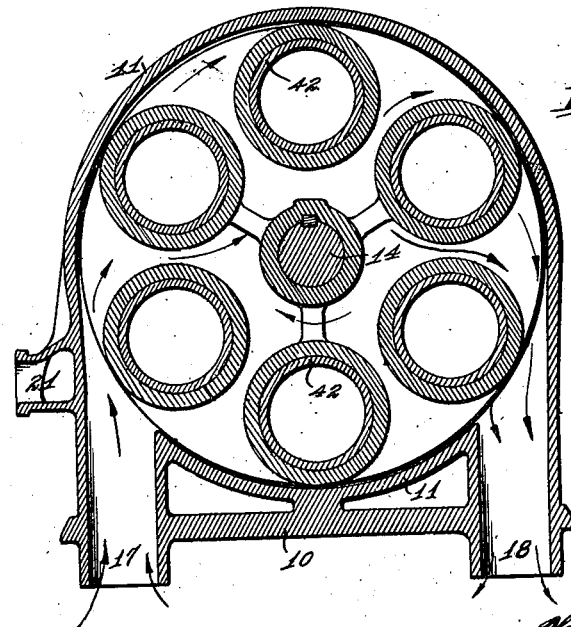
Figure 4 shows a sectional view on the line 4—4 of Figure 3.

Referring to the accompanying drawings, we shall first describe the stationary casing member. This comprises a suitable base 10 and a substantially cylindrical body portion 11 connected with the base and having two detachable heads 12. At the central portion of the heads 12 are the bearings 13 for the main shaft 14 and on one end of the shaft 14 is a crank 15 and on the other end is a disk 16 through which power may be transmitted to operate other devices. At the central portion of the base is an air intake opening 17 at one side and at the other side a corresponding air outlet opening 18 for cooling the engine, as illustrated in Figure 4, and extending through the base on opposite sides of the outlet opening 18 are two engine exhaust passage ways 19 and 20. On the side of the casing opposite to the exhaust ports 19 and 20 are two intake ports 21, illustrated in Figures 4 and 5, and a carburetor 22 of ordinary construction is arranged to communicate with these two intake ports.

Mounted in the casing near its upper portion are two spark plugs 23 included in an electric circuit which includes a timer and which will be hereinafter more fully described. At the top of the casing there is formed a receiving chamber 24 for the purpose of receiving the explosion abutment members. There are two of these abutments each of which comprises a body portion 25, shown in Figure 5, pivotally supported at one end upon the hinge pin 26 and having a rounded abutment face 27 in its other end. This rounded abutment face is designed to fit snugly against the rounded surface 28 of the chamber 24 and a spring 29 is interposed between the compartment and the top of the body portion 25 to yieldingly hold the abutment downwardly.

On each side of the abutment head is a packing bar 30 to form a gas tight joint with the sides of the abutment compartment 24, and mounted in the abutment compartment 24 adjacent to the lower edge thereof is a packing bar 31 to normally engage the rounded face 27 of the abutment member, as shown in Figure 5. We also preferably provide three packing bars in the casing, one indicated by the numeral 32 below the intake port 21, another one 33 directly above said intake port and a third 34 stands spaced below the spark plugs 23.

Mounted upon and fixed to the main shaft 14, shown in Figure 7, is a timer member 35 having three projecting cams 36. Surrounding these cams is a rotatable timer head 37 having two circuit contact makers 38 mounted therein. By moving the timer head 37 the spark may be advanced or retarded in the manner now in common use in internal combustion engines. These circuit contact makers are included in the electric circuit including a battery 39, an induction coil 40 and the spark plugs 23, as illustrated diagrammatically in Figure 7, and is now commonly employed in engines of this class.

Figure 3:
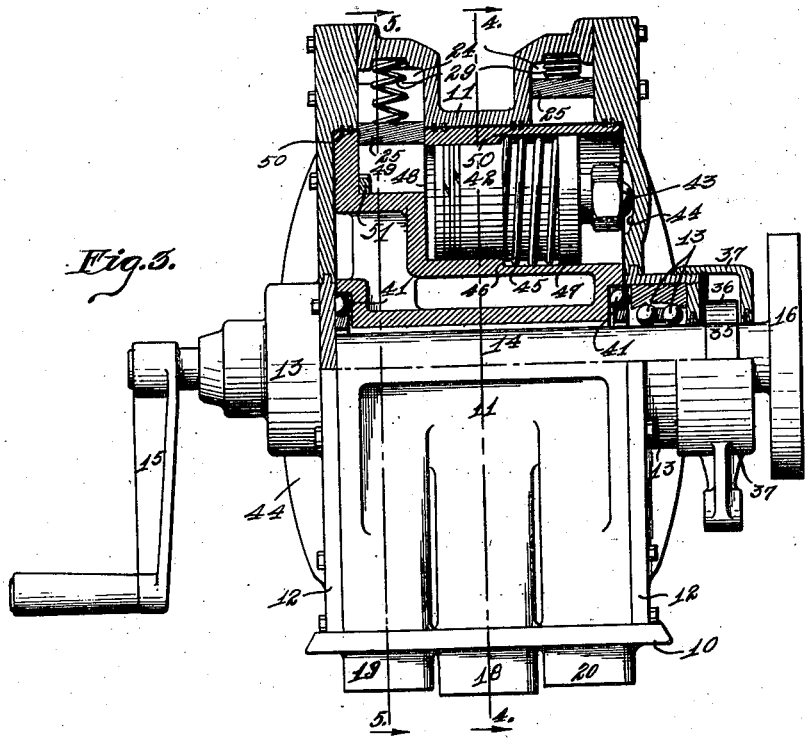
Figure 3 shows an end elevation of an engine embodying our invention, the upper portion of which is shown in vertical section taken on the line 3—3 of Figure 5.

The rotary engine member comprises a substantially cylindrical body portion fixed to the main axle 14 and designed to rotate within the stationary casing and arranged to be guided in its rotation therein by the thrust bearings 41 so arranged as to hold the rotary member against endwise movement. This rotary member comprises essentially two sets of compression cylinders, there being three on one side and three on the other arranged in staggered relation to each other, and each of these compression cylinders is about two-thirds the length of the rotary member. In Figure 4 the section is shown through the vertical transverse center of the rotary member and therefore shows all six of said compression cylinders. Figure 5, however, which is a section on the line 5—5 of Figure 3 shows only three of these compression cylinders. It is apparent, therefore, that there are three compression cylinders for each side of the rotary member, and in the following description we shall particularly describe the construction of one side only of the rotary member and it is understood that the other side containing the other three compression cylinders is the same.

Figure 1:
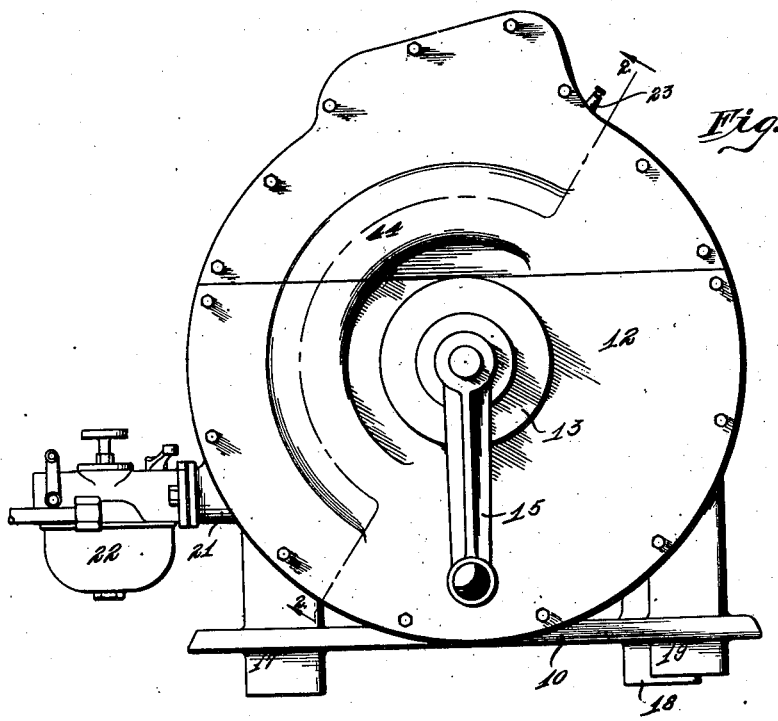
Figure 2:

Mounted in each compression cylinder is a piston 42 having at its outer end a ball bearing 43, which ball bearing is designed to travel in the cam groove 44, shown in Figures 1 and 2, of the stationary casing ends so that as the rotary member rotates the piston is moved inwardly and outwardly by said cam groove and ball bearing. For normally holding the piston toward the cam groove we have provided a spring 45, which spring has one end in engagement with a stationary shoulder 46, shown in Figure 3, and its other end in engagement with a shoulder 47 which is part of the piston proper. The end of the compression chamber opposite from the cam communicates through a passage way 48 with an explosion chamber 49. This explosion chamber is clearly illustrated in Figure 5 and there is a similar explosion chamber between each set of the compression chambers, as shown in Figure 5.

Between the two sets of explosion chambers the rotary engine member is formed hollow, as shown in Figure 4, and the hollow space thus formed is in communication with the air inlet and exhaust ports 17 and 18. Hence during the rotation of the rotary member the central portions of the compression chambers, as shown in Figure 4, will produce a fan-like effect upon the air and the air in considerable quantities will be drawn in through the intake ports 17 and circulate all around the inner ends of all six of the compression chambers and will discharge through the exhaust ports 18, thus providing for air cooling the engine.

To prevent leakage of the gas laterally from the explosion chambers in either direction we preferably provide packing rings 50, as shown in Figure 3.

Within each of the explosion chambers is a guide bar 51, shown in Figure 3, and by dotted lines in Figure 4.

The practical operation of our improved invention is as follows:

When the rotary engine member is in the position shown in Figure 5 and the carburetor is in communication with the intake chamber 21, then this intake chamber communicates through the port 48 with one of the compression chambers and as the engine revolves the piston in said compression chamber moves outwardly on account of its spring, and hence the mixture of air and gas is drawn into the compression cylinder. Then on account of the shape of the cam and after the compression chamber has thus been filled the piston is forced outwardly away from the end of the casing containing the cam and this compresses the gas until such time as the rotatable member reaches the position shown at the top in Figure 5, whereupon the abutment member 31 is moved downwardly by its spring to the position shown in said figure and at that instant the compressed gas is forced into the explosion chamber. As soon as this has been done the spark plug ignites the charge and the explosion takes place. This explosion can have no appreciable effect upon the abutment which at that time is stationary and substantially the full explosive charge is directed upon rotating the rotatable member.

During this explosion the leakage of gas in all directions from the explosion chamber is prevented by suitable packing rings and bars. Then the cylinder is rotated until the explosion chamber reaches the exhaust port 20 whereupon its charge is expelled. During the operation of the engine the explosion takes place in the explosion chamber on one side of the rotary engine and the next explosion takes place in the explosion chamber on the opposite side and so on so that the six explosion chambers are successively operated.

Our improved invention has numerous advantages in that it is very small and compact in size and there is a minimum number of working parts that are subjected to wear or displacement. Obviously the gases are taken in and compressed in the manner best adapted for the efficient use. By reason of our improved abutment device and particularly the guide 51, it is operated without shock or jar and during the time the explosion takes place it is firmly and securely placed against the engine casing. Furthermore, the interior construction of the rotary member is such that the major portion of all six of the compression cylinders and the major portion of the explosion chambers are all exposed to the air that is circulating rapidly through the engine so that efficient air cooling is provided.

We claim as our invention:

1. In an engine of the class described, the combination of a cylindrical outer casing having inlet and outlet ports, an abutment chamber formed therein between the inlet and exhaust ports, a movable abutment therein, a spring for yieldingly holding the movable abutment inwardly, a spark plug adjacent to the abutment chamber, an inner rotatable engine member having a series of explosion chambers formed in its periphery, a compression chamber adjacent to each explosion chamber and in communication therewith, a piston in each compression chamber, a cam formed in the outer casing to operate said pistons in one direction and springs to operate said pistons in the opposite direction.

2. In an engine of the class described, the combination of a cylindrical outer casing having inlet and outlet ports, an abutment chamber formed therein between the inlet and exhaust ports, a movable abutment therein, a spring for yieldingly holding the movable abutment inwardly, a spark plug adjacent to the abutment chamber, an inner rotatable engine member having a series of explosion chambers formed in its periphery, a compression chamber adjacent to each explosion chamber and in communication therewith, a piston in each compression chamber, a cam formed in the outer casing to operate said pistons in one direction and springs to operate said pistons in the opposite direction, and a driving shaft connected with the rotary member and a timer for the spark plug mounted on said driving shaft and capable of being adjusted in relation to the driving shaft to advance or retard the spark.

3. In an engine of the class described, the combination of a stationary cylindrical outer casing having two intake ports on one side and two exhaust ports on the other side, and two abutment chambers between the intake and the exhaust ports, a spring actuated abutment therein, a rotary cylindrical member within the stationary casing having on each side a series of explosion chambers formed in its periphery, a series of cylindrical compression chambers formed in the interior of the rotary engine member and extending transversely thereof, those on one side being in communication with the explosion chambers on the same side and those on the other side being in communication with the explosion chambers on the opposite side, pistons in said compression chambers, a cam on each end of the stationary engine member to operate the pistons on one side and corresponding cams on the other ends to operate the pistons on the other side, substantially as and for the purposes stated.

4. In an engine of the class described, the combination of a stationary cylindrical outer casing having two intake ports on one side and two exhaust ports on the other side, and two abutment chambers between the intake and the exhaust ports, a spring actuated abutment therein, a rotary cylindrical member within the stationary casing having on each side a series of explosion chambers formed in its periphery, a series of cylindrical compression chambers formed in the interior of the rotary engine member and extending transversely thereof, those on one side being in communication with the explosion chambers on the same side and those on the other side being in communication with the explosion chambers, a cam on each end of the stationary engine member to operate the pistons on one side and corresponding cams on the other ends to operate the pistons on the other side, the interior of the rotary engine member being formed hollow and there being in the stationary engine casing an air inlet port on one side and air discharge port in the opposite side for providing for a forced draft of cool air around all of the compression chambers and adjacent to the explosion chambers, for the purposes stated.

Des Moines, Iowa, January 9, 1922.

HENRY B. FOSTER.
JOSEPH G. FURSTENBERG.